May 24, 1938. G. W. GARMAN 2,118,644
ELECTRIC CONTROL CIRCUIT
Filed Oct. 30, 1937
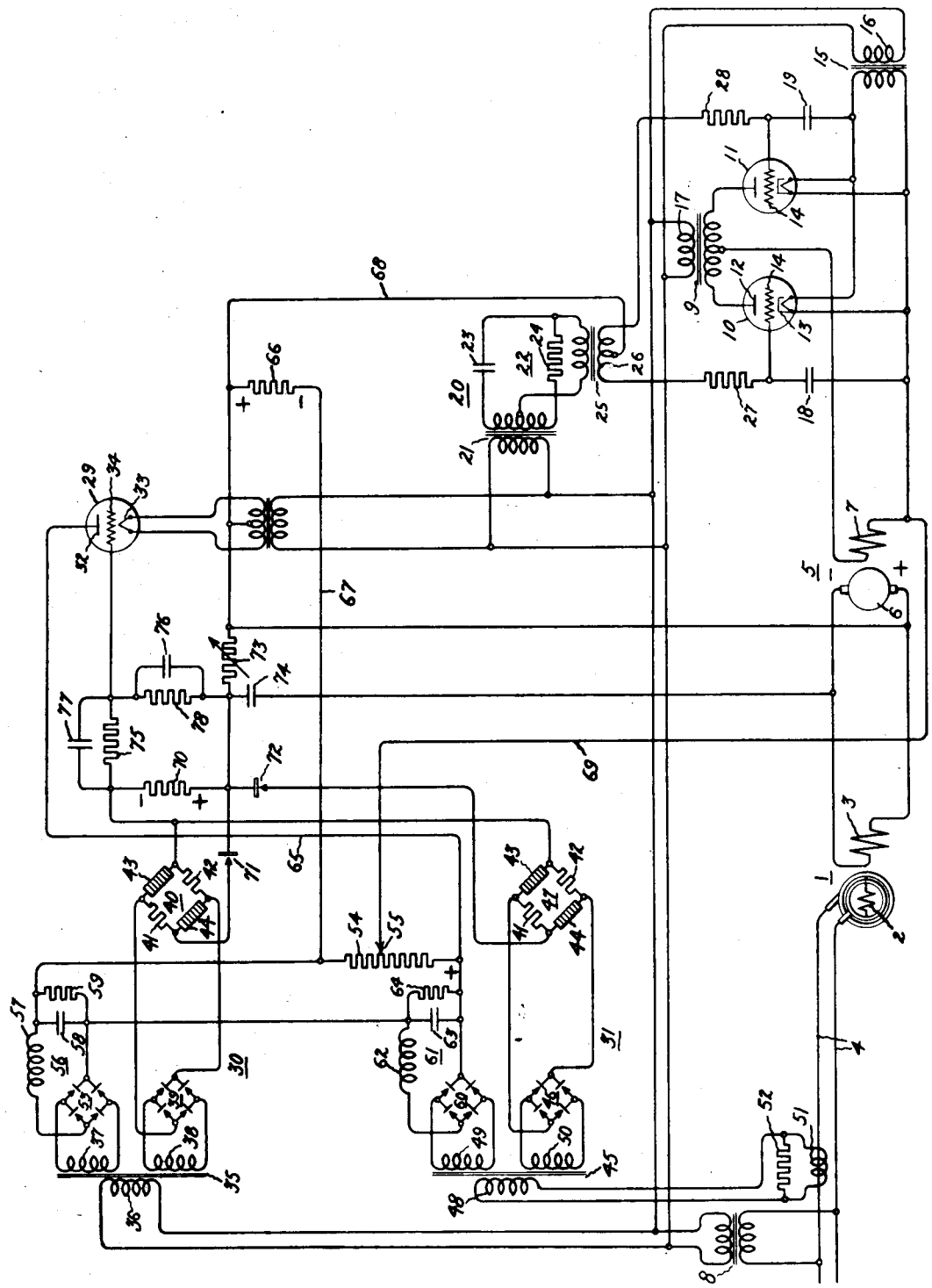
Inventor:
George W. Garman,
by Harry E. Dunham
His Attorney.

Patented May 24, 1938

2,118,644

UNITED STATES PATENT OFFICE 2,118,644

ELECTRIC CONTROL CIRCUIT

George W. Garman, Scotia, N. Y., assignor to General Electric Company, a corporation of New York Application October 30, 1937, Serial No. 171,967

6 Claims. (Cl. 171—119)

My invention relates to electric control circuits and more particularly to electric valve control or regulating systems.

In electric control and regulating systems, particularly electric valve regulating systems for dynamo-electric machines, it is frequently desirable to effect control in accordance with more than one electrical condition. For example, in electric regulators it is sometimes important to maintain the voltage of a system substantially constant within a predetermined range of operation or of energy transfer and to effect a predetermined departure from such condition when the energy transfer exceeds the predetermined range. More specifically, it is sometimes desirable to maintain the voltage constant over the normal range of operating loads of the dynamo-electric machine and to control the machine to maintain constant current when the load tends to exceed the normal operating range. Such regulation is very desirable in the operation of synchronous condensers, particularly when applied to steel mill control, where there are great variations in load requirements. In such instances a large change in synchronous volt-amperes is required to change the regulated voltage only a few per cent. If only a few of the normal number of synchronous condensers are in operation and the system power factor is subjected to a change requiring a large increase in leading volt-amperes, the synchronous condensers may be heavily overloaded in attempting to increase the voltage only a few per cent. For this reason a regulator which will not allow the condenser current to increase above its normal or nominal rating, regardless of existing conditions, is very desirable.

Electric valves have been adapted to regulating systems to effect the control of electrical characteristics of an associated circuit conjointly in accordance with a number of electrical quantities derived from the electric circuit. In order to utilize to the best advantage the precise and rapid regulation inherent in electric valve control systems, it is important to employ electrical quantity determining circuits which are highly sensitive to variations in the electrical characteristics of the circuit to be controlled. One of the most suitable and easily adaptable devices for effecting accentuation of electrical characteristics of an electric circuit is the bridge circuit. Heretofore when bridge circuits have been employed in electric control and regulating systems, it has been difficult to obtain the selective control in accordance with different electrical characteristics without sacrificing the requisite precision of operation and ruggedness of construction.

It is an object of my invention to provide a new and improved electric control circuit.

It is another object of my invention to provide a new and improved control circuit for electric valve apparatus.

It is a further object of my invention to provide a new and improved control system for dynamo-electric machines.

It is a still further object of my invention to provide a new and improved control system for selectively controlling an electro-responsive device in accordance with a number of different electrical conditions or characteristics.

In accordance with the illustrated embodiment of my invention, I provide a new and improved electric valve control system for controlling the field or excitation circuit of the dynamo-electric machine of the synchronous type. An exciter is provided to control the energization of the field circuit of the alternating current machine, and the field circuit of the exciter is energized from an associated alternating current circuit through main or power electric valves of the controlled type. The conductivities of the electric valves are controlled to vary the excitation of the alternating current machine in accordance with a number of electrical conditions or characteristics of the alternating current circuit to which the machine is connected. I provide a control system for varying the voltage impressed on the control members of the electric valves in accordance with these electrical conditions or characteristics. The control system comprises a pair of electric circuits, one of which is responsive to the voltage of the alternating current circuit, and the other of which is responsive to the current of the alternating current circuit. A control electric valve is arranged to be controlled by the pair of electric circuits to effect control of the conductivities of the main electric valves which energize the field circuit of the exciter. An impedance element, such as a resistance, is connected in circuit with a control member of the control electric valve and impresses thereon variable negative unidirectional biasing potentials. Each of the pair of electric circuits comprises a rectifier and a bridge circuit for producing a unidirectional voltage which varies in accordance with the electrical condition or characteristic to which the respective circuit is responsive. Unidirectional conducting devices are connected between the impedance element and the various bridge circuits to effect selective energization of the impedance element and hence effect selective control of the control electric valve in accordance with that bridge circuit producing the predominating unidirectional voltage. The output voltage of the alternating current machine is maintained at a substantially constant value for a predetermined range of current of the machine or of the associated circuit, and the excitation of the machine is varied to maintain the current at a substantially constant value when the current tends to exceed the predetermined nominal operating range of values. The control system controls the conductivities of the electric valves in response to both the current and voltage of the machine. Furthermore, the control system serves the purpose of automatically transferring the control from voltage to current at a predetermined maximum current value.

For a better understanding of my invention, reference may be had to the following description taken in connection with the accompanying drawing, and its scope will be pointed out in the appended claims. The single figure of the accompanying drawing diagrammatically illustrates an embodiment of my invention as applied to an alternating current machine of the synchronous type.

In the single figure of the drawing, I have chosen to illustrate my invention as applied to an excitation system for an alternating current dynamo-electric machine 1 of the synchronous type having an armature winding 2 and a field winding 3. While the machine 1 has been shown as of the alternating current type and as being single phase, it is to be understood that my invention in its broadest aspects may be applied to electric translating apparatus generally including stationary regulating apparatus and dynamo-electric machines of the direct current type and alternating current machines of the single phase or polyphase type. Armature winding 2 of machine 1 is connected to a single phase alternating current circuit 4. Field winding 3 of machine 1 may be energized from an exciter 5 having an armature member 6 and a field winding 7. Field winding 7 is energized from the alternating current circuit 4 through transformers 8 and 9 and main or power electric valves 10 and 11 which operate as a bi-phase rectifier. The electric valves 10 and 11 are preferably of the type employing an ionizable medium, such as a gas or a vapor, and each comprises an anode 12, a cathode 13 and a control means or member 14. Cathode heating elements for cathodes 13 of electric valves 10 and 11 may be energized from the alternating current circuit 4 through transformers 8 and 15. Capacitances 18 and 19 may be connected across cathodes 13 and control members 14 of electric valves 10 and 11, respectively, to absorb extraneous transient voltage which may be present in the associated control circuits.

In order to impress on control members 14 of electric valves 10 and 11 alternating voltages of predetermined phase displacement relative to the respective anode voltages, I employ a circuit 20 including a transformer 21 and a phase shifting circuit 22 which comprises a capacitance 23, a resistance 24 and a transformer 25. Secondary winding 26 of transformer 25 is connected to control members 14 of electric valves 10 and 11 through current limiting resistances 27 and 28. Transformer 21 may be energized from any suitable source of alternating current correlated in phase and frequency relative to the anode voltages of electric valves 10 and 11, and in the arrangement shown in the drawing transformer 21 is shown as being energized from alternating current circuit 4 through transformer 8.

To control the conductivities of electric valves 10 and 11 in accordance with different electrical conditions or electrical characteristics of circuit 4 or machine 1, I provide an electro-responsive means such as a control electric valve 29 which in turn is controlled by circuits 30 and 31. Electric valve 29 is preferably of the high vacuum type and includes an anode 32, a cathode 33 and a control member 34. Electric circuits 30 and 31 are each responsive to a different electrical characteristic of circuit 4 or machine 1 and control the electric valve 29, and hence control electric valves 10 and 11, in accordance with these electrical characteristics. Considering circuit 30, this circuit may comprise means responsive to one electrical characteristic or condition, such as the voltage of circuit 4, and includes a transformer 35 having a primary winding 36 and secondary windings 37 and 38. A rectifier 39, which may be of the full wave type, is connected across the secondary winding 38 to produce a unidirectional voltage which varies in accordance with the voltage of alternating current circuit 4. The rectifying elements of the rectifier 39 may be of the dry surface contact type, for example, copper oxide rectifiers of the type described and claimed in United States Letters Patent 1,640,335 granted August 23, 1927 upon an application of Lars O. Grondahl. The output terminals of the rectifier 39 are connected to a bridge circuit 40 which may comprise resistances 41 and 42 having linear current-impedance characteristics, and may include resistances 43 and 44 of the type having non-linear impedance current characteristics. The resistances 43 and 44 may be of a material of the type disclosed and claimed in United States Letters Patent No. 1,822,742 granted September 8, 1931 upon an application of Karl B. McEachron and assigned to the assignee of the present application. The bridge circuit 40 accentuates the output voltage of the rectifier 39 which varies in accordance with the voltage of circuit 4.

Circuit 31, which is responsive to a different electrical condition or characteristic of circuit 4 such as the current of this circuit, includes a transformer 45, a rectifier 46 and a bridge circuit 47. Transformer 45 includes a primary winding 48 and secondary windings 49 and 50. Transformer 45 is energized from circuit 4 in accordance with the current thereof, and a current transformer 51 may be employed for this purpose. A voltage limiting device, such as a resistance 52, may be connected across the current transformer 51. Rectifier 46 and bridge circuit 47 of circuit 31 are similar in construction and arrangement to rectifier 39 and bridge circuit 40, respectively, of circuit 30, and corresponding elements have been assigned like reference numerals. Rectifier 46 produces a unidirectional voltage which varies in magnitude in accordance with the current of circuit 4, and bridge circuit 47 accentuates the voltage output of rectifier 46 to produce a unidirectional voltage which varies in accordance with the current of circuit 4.

As an agency for providing a source of anode-cathode voltage for electric valve 29, I employ a rectifier 53 which may be connected to secondary winding 37 of transformer 35 and which transmits unidirectional current through a suitable impedance element, such as a resistance 54 having an adjustable contact 55. Connected between the rectifier 53 and the resistance 54, I provide an electric wave filter circuit 56 comprising an inductance 57, a capacitance 58 and a resistance 59 to maintain the voltage appearing across the terminals of resistance 54 at a substantially constant value. It is to be understood that the resistance 54 may be energized from any other suitable source of unidirectional current. To assure energization of the anode-cathode circuit of electric valve 29 in the event the voltage of circuit 4 decreases substantially, during the constant current range of operation, I employ a rectifier 60 which is connected to secondary winding 49 of transformer 45. Since transformer 45 is energized in accordance with the current of circuit 4, the resistance 64 will be properly energized when the system is transmitting constant current to circuit 4. Rectifier 60 is connected to resistance 64 through an electric wave filter circuit 61 including an inductance 62, a capacitance 63 and a resistance 64. A positive voltage is impressed on anode 32 of electric valve 29 from resistance 64 through a conductor 65, and the cathode 33 of electric valve 29 is connected to the negative terminal of resistance 64 through a resistance 66 and a conductor 67. The upper or positive terminal of resistance 66 is connected to the excitation circuits for electric valves 10 and 11 through a conductor 68 and produces a variable positive unidirectional voltage which is impressed on control members 14 of electric valves 10 and 11. Resistance 64 serves a dual purpose; it acts as a load for electric valve 29 and also serves as a source of negative unidirectional biasing potential which is impressed on control members 14 of electric valves 10 and 11 through a circuit including conductor 67, resistance 66, conductor 68, secondary winding 26 of transformer 25 and current limiting resistances 27 and 28. Adjustable contact 55 of resistance 54 is connected to cathodes 13 of electric valves 10 and 11 through a conductor 69 which completes the circuit for interconnecting resistances 54 and 66 with the excitation circuits for electric valves 10 and 11.

To control the conductivity of electric valve 29 in accordance with the output voltages of bridge circuits 40 and 41 in circuits 30 and 31, respectively, I employ a suitable impedance element, such as a resistance 70, which is connected in circuit with control member 34 of electric valve 29. As an agency for effecting selective energization of resistance 70 and hence to effect selective control of electric valve 29 from the voltage determining circuit 30 or from the current determining circuit 31, I provide unidirectional conducting means such as a pair of unidirectional conducting devices 71 and 72 which are respectively connected in series with the output circuits of bridge circuits 40 and 41. Unidirectional conducting devices 71 and 72 are connected to transmit current through resistance 70 in a direction such that the resistance 70 impresses a negative voltage on control member 34 of electric valve 29. The resistance 70 is energized from that bridge circuit which produces the predominating output voltage by virtue of the selective action of unidirectional conducting devices 71 and 72.

In order to provide anti-hunting means to compensate for the time delay in exciter 5, and that due to armature reaction, I interpose in the control circuit for electric valve 29 an adjustable resistance 73. The potential drop across this resistance is varied in accordance with an electrical characteristic of exciter 5, and as shown the voltage of the exciter 5 is impressed across this resistance. A capacitance 74 is connected in series with the conductors leading to resistance 73 from exciter 5, thereby reactively connecting resistance 73 to exciter 5 in order that the voltage across this resistance 73, due to the exciter, will appear only during a transient condition in the excitation circuit, or, in other words, when the exciter voltage is changing. For the purpose of delaying the potential change of the control member 34 of electric valve 29 so that the exciter anti-hunting circuit has an opportunity to prevent the exciter from prohibitively over-shooting, I connect a resistance 75 in circuit with control member 34 and a capacitance 76 from the control member side of resistance 75 to the cathode 33 of electric valve 29 through resistance 73. The resistance 75 determines the rate of build-up of voltage across capacitance 76 and the rate of build-up of voltage across the capacitance determines the delay of building up of the potential of control member 34. A capacitance 77 is connected in parallel with resistance 75 in order to form a circuit in which a small change in the voltage impressed on the control member 34 can be obtained quickly with a change in voltage of machine 1, but it will not be large enough in magnitude actually to control the output of electric valves 10 and 11. A resistance 78 may also be connected in parallel with capacitance 76 in order to modify the period of time required for the potential of control member 34 to change. The features of damping and quick response in one form of the exciter anti-hunting circuit are disclosed and broadly claimed in United States Letters Patent 2,025,583 granted December 24, 1935 upon an application of A. S. FitzGerald and G. W. Garman which is assigned to the assignee of the present application.

The operation of the embodiment of my invention shown in the drawing will be explained by considering the dynamo-electric machine 1 when it is operating as a synchronous alternating current generator. Field winding 3 of machine 1 will be energized from exciter 5 and field winding 7 of exciter 5 will be supplied with direct current by electric valves 10 and 11 which in turn are energized from the alternating current circuit 4 through transformers 8 and 9. The conductivities of electric valves 10 and 11 are controlled to control the excitation of machine 1 to maintain the output voltage thereof at a substantially constant value over a predetermined range of current transfer to circuit 4, and will maintain a predetermined maximum value of current transmitted to circuit 4 when the range of power transfer tends to exceed a predetermined value. In other words, the system responds to maintain the voltage substantially constant over the normal range of power transfer and when the current tends to exceed a predetermined maximum value the system controls the excitation of machine 1 to maintain constant current, thereby automatically transferring the control from voltage to current.

Considering more specifically the operation of the various elements of the system, circuit 20 impresses on control members 14 of electric valves 10 and 11 components of alternating voltage which lag the respective anode voltages by substantially 90 electrical degrees. Resistance 66 superimposes on these alternating components a positive unidirectional component of potential which varies in accordance with the electrical characteristics being controlled. The portion of resistance 54 between the negative terminal and the adjustable contact 55 introduces in the excitation circuits for electric valves 10 and 11 a third component which is a negative unidirectional biasing voltage of substantially constant magnitude. The contact 55 may be adjusted so that the negative unidirectional potential produced thereby is somewhat less than the positive unidirectional component produced by resistance 66.

If it be considered that the machine 1 is operating to transmit power to circuit 4 at a value within the predetermined range of operation, the conductivity of electric valve 29 and hence the energization of field winding 3 of machine 1 will be controlled in accordance with the voltage of circuit 4. Under this condition of operation, the voltage determining circuit 30 alone controls the system. Bridge circuit 40 of circuit 30 accentuates the variations in the rectified output voltage of rectifier 39 and energizes resistance 70 through unidirectional conducting device 71. By virtue of the relative adjustment of circuits 30 and 31, for this range of operation the output voltage of bridge circuit 40 predominates over that of bridge circuit 47 of the current determining circuit 31. This selective energization of resistance 70 is accomplished because of the selective action of devices 71 and 72. The current transmitted by electric valve 29 is varied in accordance with the variations in the negative unidirectional biasing potential impressed on control member 34 by resistance 70. The variations in current transmitted by electric valve 29 through resistance 66 produce variations in the positive unidirectional potential impressed on control members 14 of electric valves 10 and 11, thereby controlling the energization of field winding 3 of machine 1 in accordance with the voltage of circuit 4 or the voltage of machine 1. If it be considered that the voltage of circuit 4 decreases to a value less than the value to be maintained, the current conducted by electric valve 29 increases to increase the positive unidirectional voltage appearing across the terminals of resistance 66, thereby effecting a virtual advancement in phase of the resultant voltages impressed on control members 14 relative to the respective anode voltages and effecting ultimately an increase in the energization of field winding 3 of machine 1. In this way, the excitation of machine 1 is controlled to restore the voltage of circuit 4 to the predetermined value. Conversely, if the voltage of circuit 4 increases to a value greater than the predetermined value to be maintained, the system will respond to decrease the excitation of machine 1 to restore the voltage to the desired value.

When the current of circuit 4 increases beyond a predetermined value, the system will respond to transfer automatically the control from voltage control to current control by virtue of the selective action of unidirectional conducting devices 71 and 72. As the output voltage of bridge circuit 47 increases to a value sufficiently great to assume control, the resistance 70 will be energized from the current determining circuit 31 through unidirectional conducting device 72. During operation within this range, the excitation system responds to maintain the current in circuit 4 and the current supplied by machine 1 at a substantially constant value. The manner in which the current determining circuit 31 controls electric valves 29, 10 and 11 within this range of operation is substantially the same as that described above in connection with the operation of the voltage determining circuit 30. It is to be noted that because of the selective action of the unidirectional conducting devices 71 and 72, the voltage of circuit 4 is controlled to maintain a substantially constant voltage thereof within a predetermined range of power transfer, and to maintain a substantially constant current when the power transfer tends to exceed a predetermined value. In addition, the bridge circuits 40 and 47 in the voltage determining circuit 30 and the current determining circuit 31 effect precise and rapid control of these electrical characteristics within the respective regions of operation.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to obtain by Letters Patent of the United States is:

1. In combination, an electric circuit, electro-responsive means, a plurality of electric circuits each responsive to a different electrical quantity of said circuit and each comprising a bridge circuit for producing a voltage which varies in accordance with the respective electrical quantity, and unidirectional means connected between the bridge circuits and the electro-responsive means to effect selective energization of said electro-responsive means from the bridge circuit producing the predominating voltage.

2. In combination, an alternating current circuit, electro-responsive means to be controlled in accordance with electrical conditions of said circuit, a plurality of electric circuits each responsive to a different electrical quantity and each comprising a rectifier and a bridge circuit for producing an output voltage which varies in accordance with the respective electrical quantity, and unidirectional conducting means connected between said bridge circuits and said electro-responsive means for selectively energizing said electro-responsive means from the bridge circuit having the predominating output voltage.

3. In combination, an electric circuit, electro-responsive means, a pair of electric circuits each responsive to a different electrical quantity of said circuit and each comprising a bridge circuit for producing a voltage which varies in accordance with the respective electrical quantity, and means comprising unidirectional conducting devices connected between said bridge circuits and said electro-responsive means for controlling said electroresponsive means in accordance with one of said electrical quantities during a predetermined range of the other of said electrical quantities and for controlling said electro-responsive means in accordance with the other of said quantities within a different range of said other quantity.

4. In combination, an alternating current circuit, an electro-responsive device, a pair of electric circuits for controlling said electro-responsive device, one of said circuits including a bridge circuit for producing a voltage responsive to the voltage of said alternating current circuit, the other of said circuits including a bridge circuit for producing a voltage which varies in accordance with the current of said alternating current circuit, and unidirectional conducting means connected between the bridge circuits and said electro-responsive device for controlling said device in accordance with voltage within a predetermined range of current values of said alternating current circuit and for controlling said device in accordance with current for current values in excess of said range.

5. In combination, an electric circuit, an electric valve having a control member, a plurality of electric circuits each responsive to a different electrical quantity of said circuit and each comprising a bridge circuit for producing a voltage which varies in accordance with the respective electrical quantity, an impedance element connected in circuit with said control member, and unidirectional conducting means connected between the various bridge circuits and said impedance element to effect selective energization of said impedance element from the bridge circuit producing the predominating voltage.

6. In combination, an alternating current circuit, an electric valve having a control member, an impedance element connected to said control member, a pair of electric circuits, one of said electric circuits being responsive to the voltage of said alternating current circuit and comprising a rectifier and a bridge circuit for producing a unidirectional voltage which varies in accordance with the voltage of said alternating current circuit, the other of said circuits including a rectifier and a bridge circuit for producing a unidirectional voltage which varies in accordance with the current of said alternating current circuit, and unidirectional conducting means connected between the bridge circuits and said impedance element for selectively energizing said impedance element from the bridge circuit producing the predominating voltage.

GEORGE W. GARMAN.